J. Laidlaw,
Gas Meter,
№ 9,367.    Patented Nov. 2, 1852.
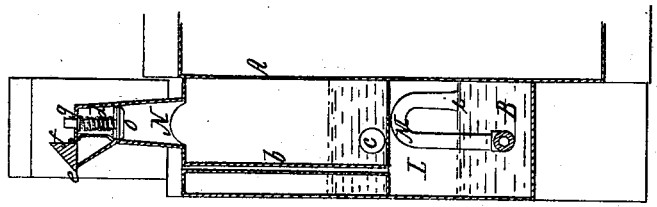
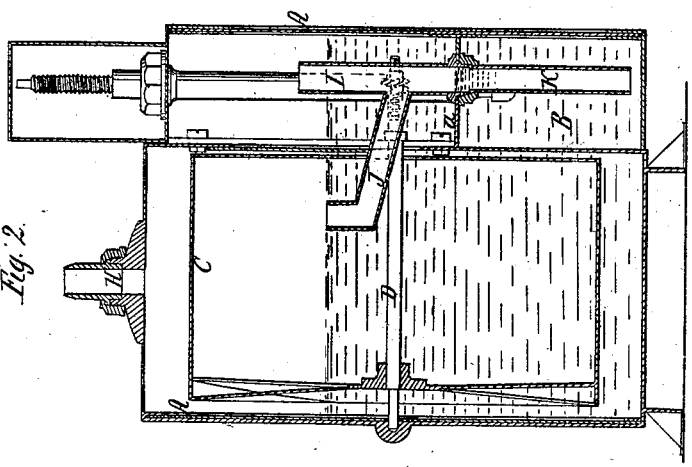
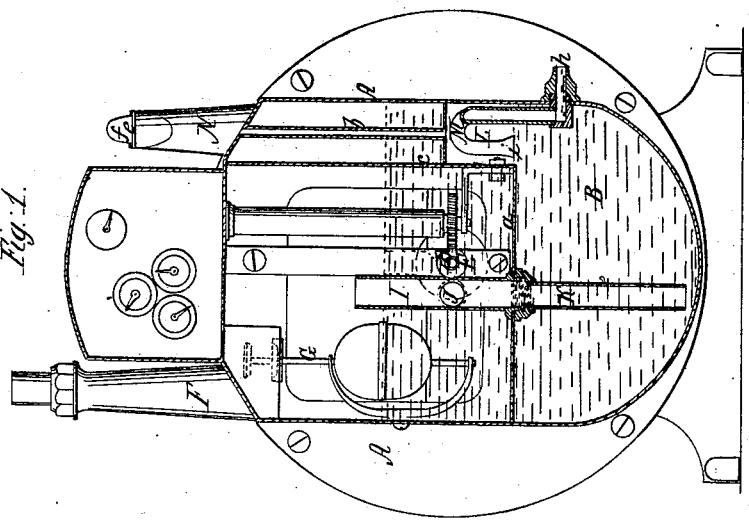

UNITED STATES PATENT OFFICE.

JOHN LAIDLAW, OF NEW YORK, N. Y.

IMPROVEMENT IN GAS-METERS.

Specification forming part of Letters Patent No. 9,367, dated November 2, 1852.

*To all whom it may concern:*

Be it known that I, JOHN LAIDLAW, of the city, county, and State of New York, have invented certain new and useful Improvements in Gas-Meters; and I do hereby declare that the following is a full, clear, and exact description of the same, reference being had to the accompanying drawings, forming part of this specification, in which—

Figure 1 is a vertical section of a meter constructed according to my improvements, taken parallel with the face in such a line or plane as best shows the working parts. Fig. 2 is a vertical section taken nearly in the center at right angles to Fig. 1. Fig. 3 is a section of the dry well and of the arrangements for filling the meter with water, taken at right angles to the view of Fig. 1.

Similar letters of reference indicate corresponding parts in each of the several figures.

This invention relates to the meter usually known as the "wet meter," consisting of a drum which is partly submerged in water or other fluid contained in a close vessel, and which is caused to revolve by the gas entering it and to communicate motion through a train of wheel-work to a set of indicators. In order to insure the accurate working of this meter, it is necessary that the fluid shall be kept to a uniform level, and it is with a view to effect this more perfectly that part of my improvements have been made. In the meter as commonly constructed considerable inconvenience is caused by the water overflowing into and lodging in the pipe which forms the inlet for the gas to enter the drum. This is remedied by my improvements. Another great objection to the common meter is the use of screws or caps, which require to be removed to allow the escape of water from the aforesaid inlet-pipe, and also of the surplus water in the meter. These screws I dispense with and provide for the escape of the water as it accumulates or rises, thus preventing the liability to accidents, which are sometimes caused by the escape of gas when the said screws are carelessly left out. Another source of trouble arises from the leaving out of the screw or cap which closes the pipe through which the water is introduced. This I obviate by substituting a self-closing valve.

To enable those skilled in the art to make and use my invention, I will proceed to describe its construction and operation.

A is the case which contains the water or fluid and all the parts which constitute the meter, which is similar to the case of the common meter, except that there is an additional chamber, B, under the front part, which is shut off from the other parts of the case except by what I term the "seal-pipe," which will be explained in due time.

C is the drum, D its shaft, and E the worm which actuates the indicating apparatus.

F is the pipe through which the gas is admitted to the meter. This is furnished with a float-valve, G, as in the common meter.

H is the exit-pipe by which the gas leaves the meter.

I is the inlet-pipe which conducts the gas into the drum by the bent arm J, whose mouth is exactly on a level with the surface of the water in the meter. The pipe I has the seal-pipe K connected with it, the seal-pipe forming a continuation of it and passing through the deck or partition $a$ nearly to the bottom of the chamber B, into which it opens. The water in the chamber B rises in the seal-pipe and inlet-pipe I and closes or seals the inlet-pipe at the bottom, the head of water in the chamber being always more than sufficient to counterbalance the highest pressure of the gas. In the upper part of the chamber B, at one side, there is a recess, L, which is the dry well, and is intended to receive the water which overflows the mouth of the pipe J and runs down the inlet-pipe I. The dry well is provided with a siphon, M, the shorter leg of which opens into it, and the longer leads to the outside of the meter. By this siphon the dry well is emptied when the water rises high enough in it to expel the air, and the water in the chamber B is reduced to the level of the mouth $i$ of the siphon. A pipe, $b$, leads from outside the meter to the dry-well to supply air to enable the siphon to act.

N is the pipe by which the meter is filled with water, the water entering through a hole, $c$. In the upper part of this pipe there is a valve, O, which opens downward, but is kept closed by a spring, $d$, which raises it when it is not depressed by other means. On the mouth of the pipe N there is a lip-spout, which is closed by a hinged lid, $e$, which has a projection, $f$, on its upper side intended, when the lid is opened, to press on the end of the valve-spindle $g$, which projects through the top of the pipe, and press down the valve for the purpose of allowing the water to be poured in, the spring closing it again when the pressure is removed from above it.

When the meter is to be set in operation, the water is poured in through the pipe N, and, running through $c$, it fills the case up to the level of the mouth of J, after which it runs down the pipe J, I, and K into the chamber B, (water not being admitted into the chamber except through those pipes,) until it fills the siphon M and begins to run out at $h$, when no more must be poured in. The siphon will empty the dry well L and reduce the head in the chamber B and pipes K J to a level with its mouth $i$. The meter is now in condition for operation. The gas, entering through F and passing through I J to the drum and out at H, gives revolution to the drum and is measured and the consumption registered as in the common meter.

Lighting-gas or carbureted hydrogen as commonly used contains impurities which condense in the meter, and by accumulation raise the level of the water, and thus by diminishing the gas room cause the meter to measure and register a larger quantity than actually passes through it. In my meter the level cannot possibly be raised above the mouth of the pipe J, as the water must run down J I K into the chamber B, this chamber being perfectly full, except the dry well L, the area of whose surface is small. The water rises in the dry well at a considerable rate, and in time fills the siphon, and then the level is instantly reduced to $i$. The level in the pipes K I is always the same as that in the dry well, and never reaches the entrance to the pipe J; but in the common meter the water will run over into J and into I, and the only way of preventing the entrance from I to J being closed is to make a dry well at the bottom of I. This dry well in time fills, and as the water reaches the entrance to J it bubbles and prevents a regular flow of gas, and thus causes a flickering in the light. The only remedy for the above inconvenience is to draw off the water from the dry well, which is done by taking out a screw from an opening provided for the purpose. The water in the meter when it has risen too high requires to be let out at a waste-hole, which is provided for the purpose in the side of the meter and closed by a screw.

My meter, while it obviates the necessity for the openings above described, which must be opened by hand, and which are dangerous, is entirely self-regulating as regards the level of the water, and its dry well is self-emptying. The consumer is protected from the undue raising of the level, and additional protection is given to the gas company by dispensing with a direct communication from the pipe I to the outside, such as can be made by taking out the screw from the bottom of the dry well of the common meter. A dishonest consumer, by connecting a pipe to this opening, can consume any quantity of gas without causing it to pass through the measuring-drum.

What I claim as my invention, and desire to secure by Letters Patent, is—

The chamber B and siphon M, in combination, in the manner substantially as described, with the pipes I J, or other pipe or pipes having an opening or openings similar to J at the required level of the liquid in the meter for the purpose of preserving the level and discharging the surplus liquid from the meter.

JOHN LAIDLAW.

Witnesses:
EL. POLHAMUS,
R. W. FENWICK.